C. RUSSELL, dec'd.
A. P. RUSSELL, Adm'r.
Chair-Bottoms.
No. 6,046. Reissued Sept. 8, 1874.
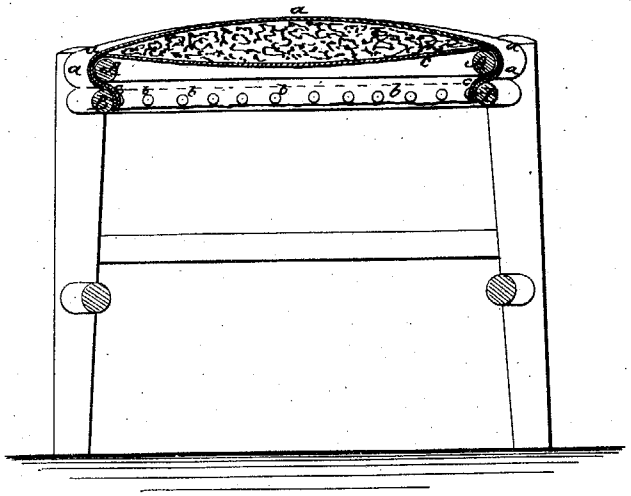
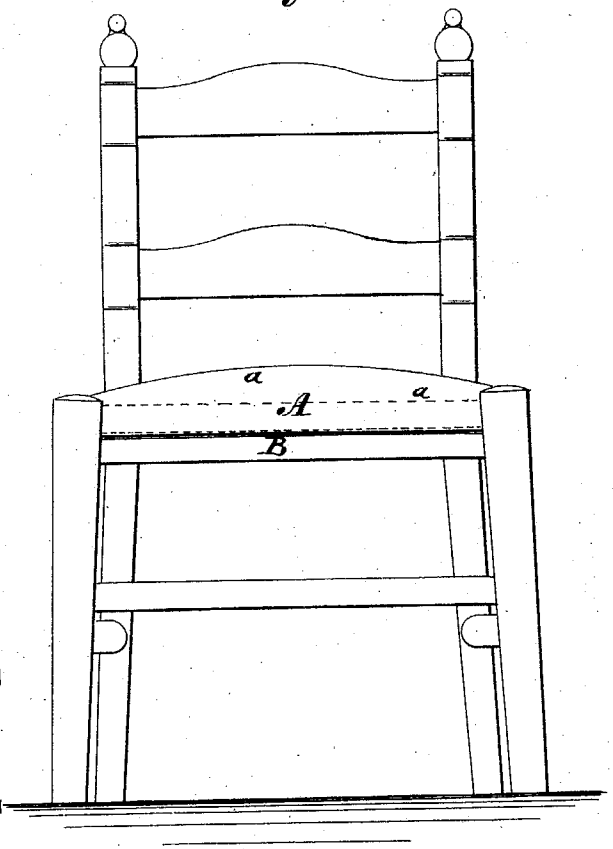
Witnesses:
W. Lovell
H. L. Mattenberg
Inventor:
A. P. Russell, Adm'r.
Daniel H. Heywood, assee
G. W. Brewster
Atty
THE GRAPHIC CO. PHOTO-LITH. 39 & 41 PARK PLACE, N.Y.

UNITED STATES PATENT OFFICE.

DANIEL H. HEYWOOD, OF BOSTON, MASSACHUSETTS, ASSIGNEE OF ADDISON P. RUSSELL, ADMINISTRATOR OF CHARLES RUSSELL, DECEASED.

IMPROVEMENT IN CHAIR-BOTTOMS.

Specification forming part of Letters Patent No. 50,166, dated September 26, 1865; reissue No. 6,046, dated September 8, 1874; application filed August 22, 1874.

*To all whom it may concern:*

Be it known that CHARLES RUSSELL, of Wilmington, in the county of Clinton and State of Ohio, invented a new and useful Improvement in the Construction of Chair-Bottoms; and that the following is a full, clear, and exact description of the same, reference being had to the accompanying drawings and to the letters of reference marked thereon, making a part of this specification—

Figure 1 being a front elevation of a common chair constructed with the improvement, and Fig. 2 a transverse vertical section of the same, looking toward the front side thereof.

Like letters designate corresponding parts in both figures.

This invention is in the nature of an improvement in chair-seats; and the invention consists in a chair constructed with supplemental rounds or slats in addition to the ordinary rounds or slats which form the seat-frame.

This improvement is applicable to all chairs in which the seat is secured to seat-frames. It may also be applied to lounges, settees, stools, &c.

In addition to the ordinary seat-frame rounds A A, forming the seat-frame, there are secured in any desirable manner to the legs or supports of the chair, in close proximity to said seat-frame rounds, supplemental rounds or slats B B. These rounds are placed close enough to the seat-frame rounds A A to allow the upholstered material forming the seat to pass between said seat-frame rounds and supplemental rounds, substantially as shown in Fig. 2. Both the top covering *a* and bottom canvas or material *c*, which sustains the stuffing material C, of any kind, are together first carried over the upper set of rounds A A, and down around the outside thereof, thence inward between the two sets of rounds, and finally down the inside of the lower set of rounds or slats B B, to which they are tacked by nails *b b*, or fastened in any suitable manner, substantially as shown in Fig. 2.

This additional set of rounds or slats B B may be simple turned ones, as shown, for common chairs. But they may be of any form desired, and since they are generally in sight, although they may be covered, they may be made as ornamental as required, and of considerable width for handsome chairs.

The advantages of this construction are obvious.

Having thus described the invention of said CHARLES RUSSELL, what I claim as new, and desire to secure by Letters Patent, is—

A chair constructed with supplemental rounds or slats, placed in close proximity to and in combination with the ordinary seat-frame rounds, substantially as and for the purpose described.

DANIEL H. HEYWOOD.

Witnesses:
H. L. WATTENBERG,
G. M. PLYMPTON.